(12) United States Patent  
Rayburn et al.

(10) Patent No.: US 9,432,862 B2
(45) Date of Patent: Aug. 30, 2016

(54) OTA MOBILE DEVICE CLASSIFICATION

(71) Applicant: Fluke Corporation, Everett, WA (US)

(72) Inventors: Greg Rayburn, Sunnyvale, CA (US); Richard Cue, Walnut Creek, CA (US); Kevin Chen Wang, San Francisco, CA (US)

(73) Assignee: Airmagnet, Inc., Westford, MA (US)

( * ) Notice: Subject to any disclaimer, the term of this patent is extended or adjusted under 35 U.S.C. 154(b) by 102 days.

(21) Appl. No.: 13/707,524

(22) Filed: Dec. 6, 2012

(65) Prior Publication Data

US 2014/0160948 A1    Jun. 12, 2014

(51) Int. Cl.
*H04W 24/08* (2009.01)
(52) U.S. Cl.
CPC .................................... *H04W 24/08* (2013.01)
(58) Field of Classification Search
CPC .............................. H04L 43/12; H04W 24/08
See application file for complete search history.

(56) References Cited

U.S. PATENT DOCUMENTS

| | | | |
|---|---|---|---|
| 2009/0119776 A1* | 5/2009 | Palnitkar et al. | 726/25 |
| 2011/0276366 A1* | 11/2011 | Goyet et al. | 705/7.29 |
| 2013/0010719 A1* | 1/2013 | Shapira | 370/329 |
| 2013/0136016 A1* | 5/2013 | Lee et al. | 370/252 |
| 2013/0201989 A1* | 8/2013 | Hu et al. | 370/392 |
| 2013/0250834 A1* | 9/2013 | Seok et al. | 370/311 |
| 2013/0308618 A1* | 11/2013 | Panneerselvam | 370/338 |
| 2013/0331130 A1* | 12/2013 | Lee | 455/457 |
| 2014/0286321 A1* | 9/2014 | Balian et al. | 370/338 |

* cited by examiner

*Primary Examiner* — John Blanton
(74) *Attorney, Agent, or Firm* — Scott D. Wofsy; Christopher J. Capelli

(57) ABSTRACT

A system, method and device for classifying mobile devices based on frame characteristics and frame content provides a network administrator the ability to better understand actual network use by BYOD (bring your own device) type users, which are becoming more common, giving the ability to better understand actual use beyond the planned for stations factored into a wireless network design.

8 Claims, 4 Drawing Sheets

OTA MOBILE DEVICE CLASSIFICATION

BACKGROUND OF THE INVENTION

This invention relates to network test and measurement, and more particularly to over the air mobile device detection.

The ability to accurately classify mobile devices on a WIPS overlays system is important to wireless network administrators.

Since the introduction of portable devices, most notably the first iPhone in 2007, BYOD or Bring your own Device has increased dramatically in enterprise wireless networks. Employees are on average brining 2 to 3 extra wireless devices into work (such as iPhones, iPads, Android phone or tablets, etc.). All of these extra devices were not factored into the design of the enterprise wireless network. Being able to accurately track these devices and separate them from "Stations", devices which are planned as part of the network, is key to understanding what is the true number of devices that are being allowed to connect to an enterprise network.

Current methods to detect wireless devices in an enterprise network involve the use of hardware sensors that passively sniff 802.11 traffic, for example on the 2.4 GHz and 5 GHz frequencies. The sensors systematically scan through all of the channels on an 802.11 wireless network on a continuous basis, and when a wireless device is detected, it is classified as a Station (a known or expected device, such as an employee laptop), an Access Point, or Ad-Hoc.

SUMMARY OF THE INVENTION

In accordance with the disclosure, the ability to classify mobile devices based on frame characteristics and frame content is provided.

Accordingly, it is an advantage of the present disclosure to provide an improved system and method for enterprise network maintenance.

It is a further advantage of the present disclosure to provide an improved system and method for detecting and classifying devices on a wireless network.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present technology comprises method and apparatus to accurately classify smart phones, tablets and other BYOD devices on a WIPS overlay system, allowing a wireless administrator to differentiate between approved wireless stations and other wireless devices.

Figure 1:
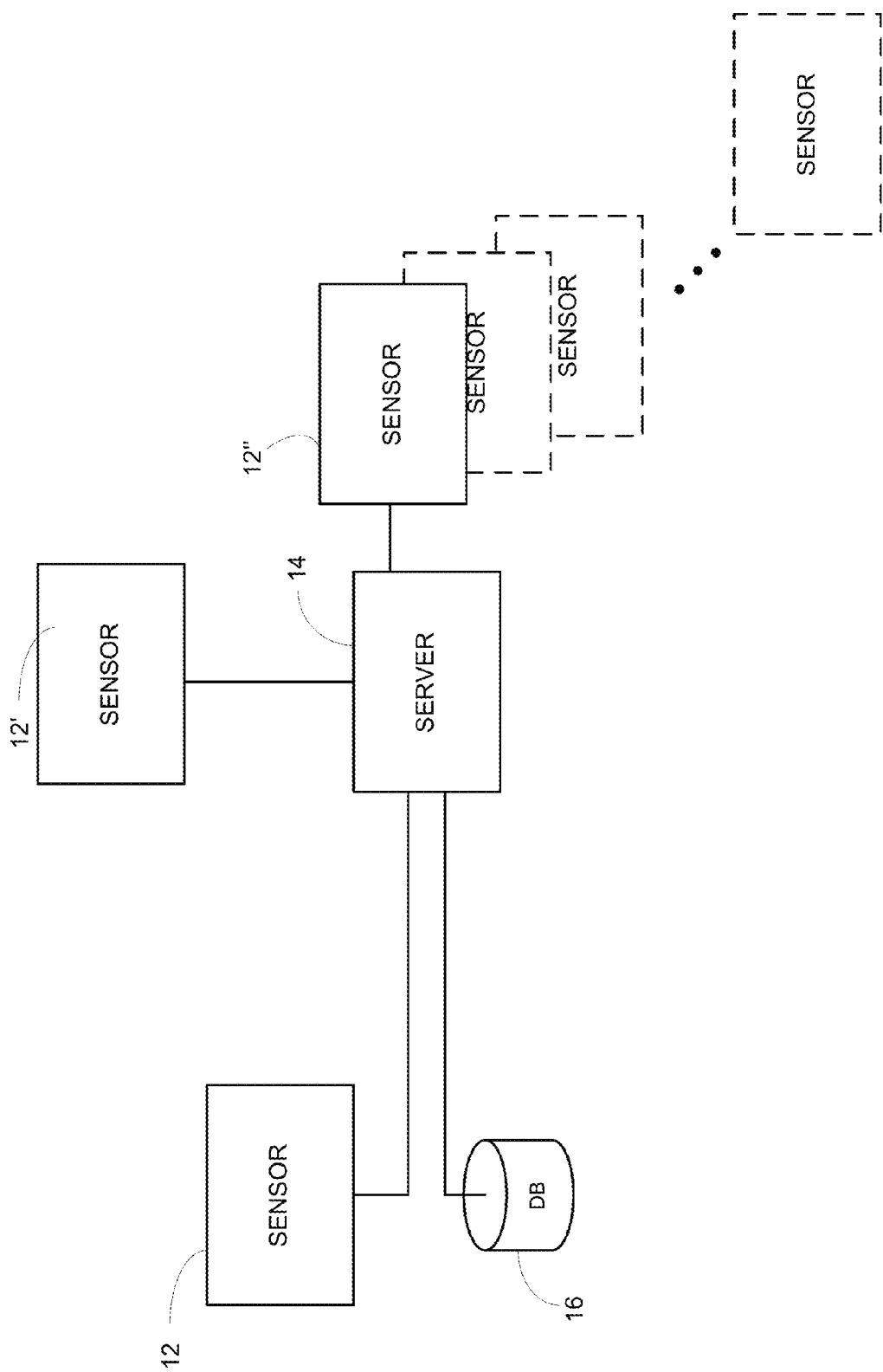
FIG. 1 is a block diagram of a network test instrument embodying the methods and apparatus

Referring to FIG. 1, a block diagram of the overall system, the system suitable comprises one or more sensors 12, 12', 12", etc., which are in communication with a management server 14, and the management server interacts with a database 16. The sensors monitor wireless traffic, providing analysis to determine device type of devices operating on the wireless network, and send the results to the management server 14, which sends the information to the database 16 for archiving. The interface between the sensors and server and database can be wired or wireless, or a combination thereof, for example.

Figure 2:
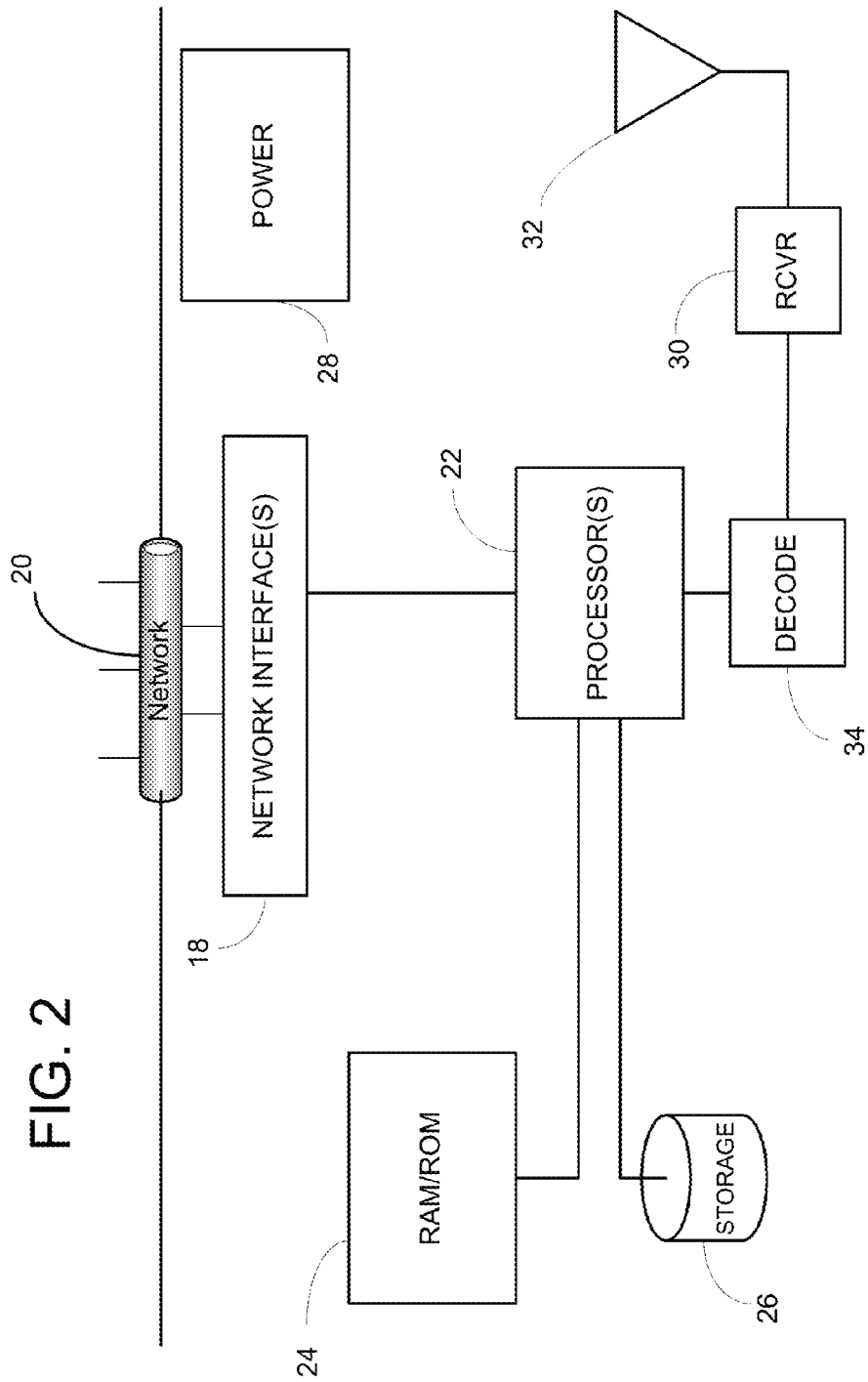
FIG. 2 is a block diagram of the overall system in which the device operates.

FIG. 2 is a block diagram of an individual sensor 12, wherein the sensor includes one or more interfaces 18 which attach the device to a network 20 (which, as noted above, may comprises wired or wireless interfaces and networks, or combinations thereof), one or more processors 22 for operating the sensor, memory such as RAM/ROM 24 or persistent storage 26, and power supply 28 which may include battery or AC power supplies. A receiver 30 connects to antenna 32, supplying received signals to decoder 34, which supplies decoded wireless signals to the processor(s) 22.

The sensor 12 is suitably mounted in a ceiling, for example, or other out of the way location, in an office or factory or other facility to receive and monitor wireless traffic in the area of the sensor's location.

The processor takes the received decoded signals and performs an analysis described in connection with FIG. 3.

In operation, the sensor passively monitors wireless network traffic received via antenna 32, and the decoded data is provided to the processor for classifying devices, determining whether a device operating on the wireless network is a station (an approved wireless device configured by the network administrator to be a station on the network) or a mobile device, another device which is not one of the pre-qualified devices on the network.

The sensor observes the network traffic (step 36) and for an individual device's packet traffic determines the vendor OUI (step 38), the Organizationally Unique Identifier, a 24-bit number that is purchased from the Institute of Electrical and Electronics Engineers, Incorporated (IEEE) Registration Authority. This identifier uniquely identifies a vendor, manufacturer, or other organization which manufactures or sells the mobile device, and is included in the MAC id of the transmitting device that is contained in the data transmitted.

When the particular mobile device sends a Probe Request Frame (a frame sent when the device wants to obtain information from another station on the network) additional information becomes available which is used to further classify the mobile device, so the sensor continues monitoring until a Probe Request Frame is observed (block 40), which will provide additional information about the mobile device, allowing identification of the device (block 42), and the sensor then sends that information to the server (block 44). The server can then decide what to do with that data, for example, storing it in database 16 if the device is determined to not be a station, but is instead a BYOD type device.

As an example, a mobile device would send a Probe Request Frame to determine which access points are within range.

The determined vendor OUI for the device might be, for example, Apple, Samsung, Blackberry, HTC, Sony-Ericsson, Nexus, or Microsoft Surface, etc.

The Probe Frame Request includes additional information about the device capabilities, which can also be provided to be stored in the database.

Examples of the additional information for a selected set of current devices include:

For 801.11n devices, from the Probe Frame Request, the sensor can identify that the device only supports single spatial stream (which covers every device except Microsoft Surface for currently known devices).

For Apple devices (iPad 1, 2 and 3 and iPhone 4 and 4s), the Probe Frame Request will indicate that Short Guard Interval for 20 MHz is not supported.

For Apple iPhone 5, the Probe Frame Request will indicate that Short Guard Interval for 20 MHz is not supported, plus HT LDPC coding capability is not supported.

For Apple iPhone, 3G and 3GS, the Probe Frame Request will indicate that Supported Rates Tag length=4 and Extended Supported Rates Tag length=8.

For Samsung devices, the Probe Frame Request will indicate that support is provided for single spatial stream only.

For Microsoft Surface, the Probe Frame Request will indicate that support for 2 spatial streams+ Short Guard interval is disabled on both 20 and 40 MHz.

As devices are identified, the information is passed to the management server 14, which stores the device information in the database 16. The server in conjunction with the database can determine which devices are stations, and which are 'mobile devices' or BYOD type devices. A network administrator can then later study the database information to gain a better understanding of network usage and what kinds and numbers of non-station devices are using the network.

Figure 4:
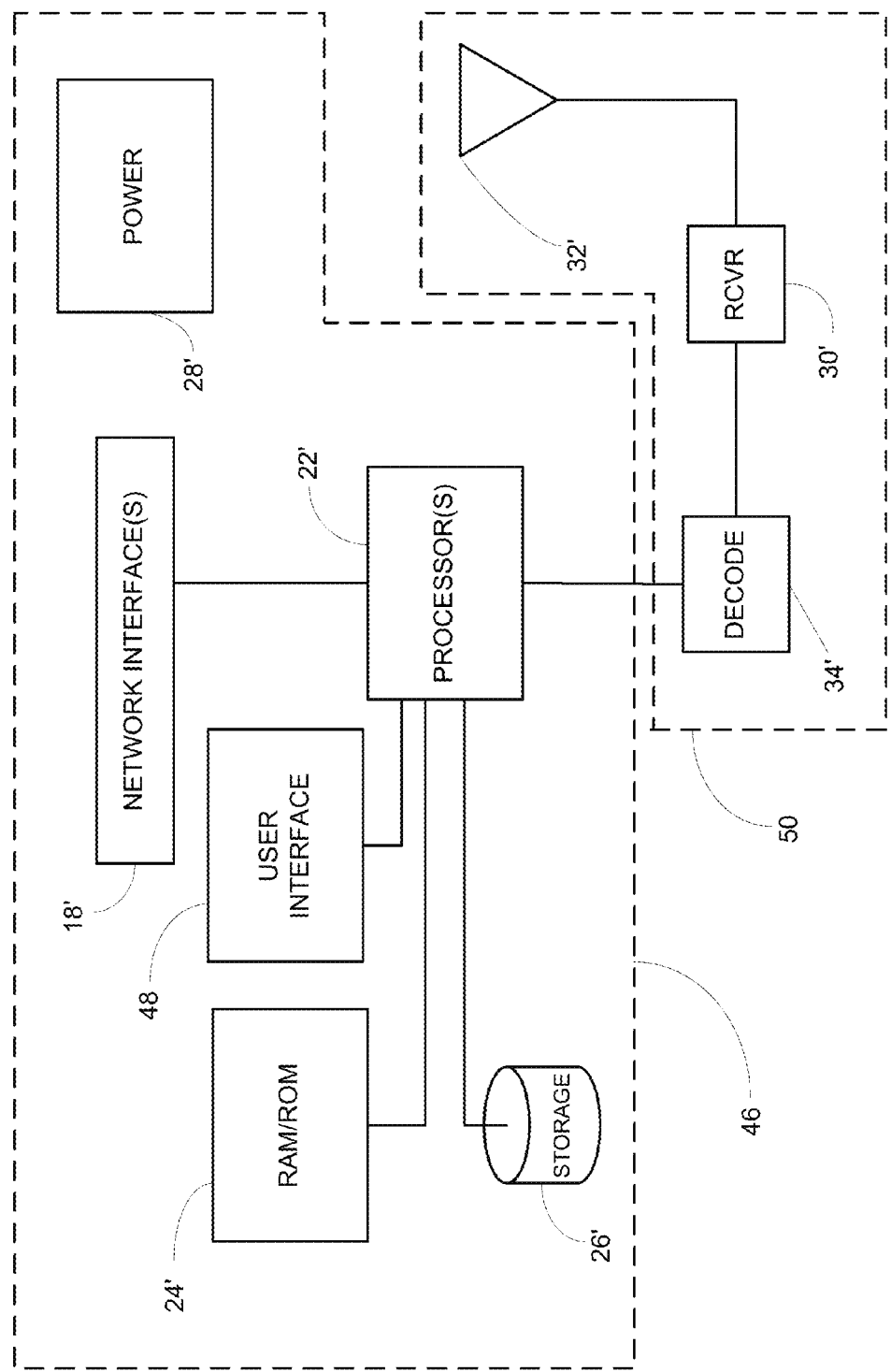
FIG. 4 is a block diagram of an alternative configuration of the system, method and apparatus.

An alternative embodiment is illustrated in FIG. 4, wherein in place of the fixed location sensors, a mobile sensor may be used, for example implemented as a stand alone device or implemented using a laptop computer or other mobile device. In this configuration, a mobile computing device 46 is employed, which may comprise a lap top computer, a specialized hand-held device, mobile phone, or the like, with the mobile device including optional one or more interfaces 18' which allow attachment to remote computers or networks (and again which may comprises wired or wireless interfaces and networks, or combinations thereof), one or more processors 22' for operating the sensor, memory such as RAM/ROM 24' or persistent storage 26', and power supply 28' which may include battery or AC power supplies. A user interface 48 may be provided, to interact with the user and receive operational commands and display results.

A receiver 30' connects to antenna 32', supplying received signals to decoder 34', which supplies decoded wireless signals to the processor(s) 22'. The receiver, antenna and decoder may be provided as a separate unit 50, which can comprise an adapter card designed to interface with the device 46. The unit 50 may further include additional processing to perform additional analysis, or the analysis can be performed by the mobile device 46.

The operation of the decoder 34' may also be provided by the processor(s) 22', in which case the unit 50 would not include a decoder, the raw data from the receiver being provided to processor(s) 22' for decoding.

Figure 3:
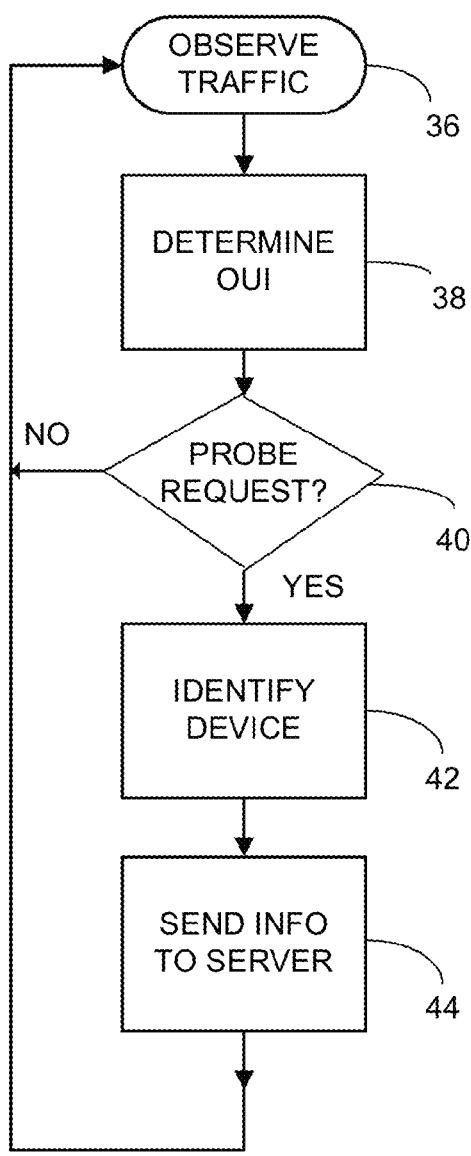
FIG. 3 is a flowchart of operational steps of the system and method.

In operation, the mobile device 46/unit 50 operate as self-contained units, and do not need to report or connect back to a central server as in the earlier embodiment, therefore, the operational steps correspond to FIG. 3, with step 44, "send info to server", being optional, or, deferred until such time as the mobile device 46 is able to communicate with a server, such as when a technician returns to office or remotely connects to a server/database, if desired.

Accordingly, a passive sensor is provided to analyze 802.11 network traffic, looking for devices and traffic anomalies, automatically detecting whether a wireless device is a station or a mobile device, optionally sending that information to a database for later study and use.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

The invention claimed is:

1. A mobile computing device configured to couple to a remote server for classifying devices on a 802.11 wireless network comprising:
   a sensor component having an antenna coupled to a receiver for monitoring raw wireless network traffic data and a decoder coupled to the receiver, the decoder configured to decode the raw wireless network traffic data received from the antenna; and
   a processing component separate from the sensor component having:
      (i) a processor coupled to the sensor component for receiving the monitored wireless traffic network traffic for determining device characteristics data for devices operating on the 802.11 wireless network based on device OUI and 802.11 probe request data frames, wherein the determined device characteristics include Short Guard interval support status for at least two different channels; and
      (ii) a network interface coupled to the remote server for transmitting the determined device characteristic data to the remote server, wherein the remote server is configured to classify the device operating on the 802.11 wireless network based on a pre-qualified list of devices.

2. The device according to claim 1, wherein the determined device characteristics data includes device vendor ID.

3. The device according to claim 1, wherein the determined device characteristics data includes device capabilities.

4. The device according to claim 3, wherein the determined device characteristics data includes spatial stream support level.

5. the device according to claim 3, wherein the Short Guard Interval support status further includes channel bandwidth data.

6. The device according to claim 3, wherein the determined device characteristics data includes Supported Rates Tag length and Extended Supported Rates Tag length.

7. The device according to claim 1, wherein the processor is configured to decode raw monitoring wireless network traffic data received from the antenna.

8. The device according to claim 1, wherein the network interface is wirelessly coupled to the remote server.

* * * * *